(12) United States Patent
Nolan et al.

(10) Patent No.: US 9,779,770 B1
(45) Date of Patent: Oct. 3, 2017

(54) 3DMR MEDIA WITH MULTIPLE WRITE FIELD LEVELS

(71) Applicant: Seagate Technology LLC, Cupertino, CA (US)

(72) Inventors: Thomas P. Nolan, Fremont, CA (US); Bruce Buch, Westborough, MA (US); Philip L. Steiner, Los Altos, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/174,520

(22) Filed: Jun. 6, 2016

Related U.S. Application Data

(60) Provisional application No. 62/171,098, filed on Jun. 4, 2015.

(51) Int. Cl.
| | |
|---|---|
| *G11B 5/74* | (2006.01) |
| *G11B 5/64* | (2006.01) |
| *G11B 20/14* | (2006.01) |

(52) U.S. Cl.
CPC ............... *G11B 5/64* (2013.01); *G11B 20/14* (2013.01)

(58) Field of Classification Search
CPC ............ G11B 5/314; G11B 2005/0021; G11B 11/10502; G11B 11/1051; G11B 11/10515; G11B 11/10521; G11B 5/3903; G11B 5/00; G11B 5/66; G11B 5/82; G11B 5/855; G11B 5/656; G11B 5/64
USPC .......... 360/313, 59, 131, 40, 65, 123.01, 55, 360/317, 125.04, 125.43, 125.51, 126, 360/316; 427/127; 428/836, 836.1, 428/828.1, 829

See application file for complete search history.

(56) References Cited

U.S. PATENT DOCUMENTS

| | | | |
|---|---|---|---|
| 6,246,640 B1 * | 6/2001 | Shimazaki | G11B 11/10502 369/13.1 |
| 6,700,720 B1 * | 3/2004 | Allenspach | G11B 5/00 360/123.01 |
| 6,753,561 B1 | 6/2004 | Rinerson et al. | |
| 7,502,248 B2 | 3/2009 | Lim | |
| 7,936,597 B2 | 5/2011 | Clinton et al. | |
| 8,199,564 B2 | 6/2012 | Zheng et al. | |
| 8,236,576 B2 | 8/2012 | Han et al. | |
| 8,411,494 B2 | 4/2013 | Shukh | |
| 8,446,761 B2 | 5/2013 | Apalkov et al. | |

(Continued)

*Primary Examiner* — Nabil Hindi
(74) *Attorney, Agent, or Firm* — Hall Estill Attorneys at Law

(57) ABSTRACT

A three-dimensional magnetic recording media can consist of a single recording layer configured with three or more separate magnetization levels. A first magnetization level can be written to a selected region of said recording layer by applying a first write field to the grains of said region to form a "spin-up" magnetization in the grains of said region. A second magnetization level can be written by applying a second opposite write field to selected grains of said region to form a "spin-down" magnetization. At least a third intermediate magnetization level can be written by applying a weaker or alternating write field to grains of said region to form an intermediate magnetization comprising a mixture of spin-up and spin-down grains. By such method, said region may comprise a data bit capable of storing 3 or more units of information corresponding to the number of separate magnetization levels employed.

19 Claims, 2 Drawing Sheets

(56) References Cited

U.S. PATENT DOCUMENTS

| | | | |
|---|---|---|---|
| 8,988,814 B1* | 3/2015 | Harada | G11B 5/09 |
| | | | 360/65 |
| 9,224,941 B2 | 12/2015 | Ruotolo | |
| 9,236,561 B2 | 1/2016 | Krounbi et al. | |
| 2002/0118474 A1* | 8/2002 | Fukuda | G11B 20/10527 |
| | | | 360/40 |
| 2010/0149676 A1* | 6/2010 | Khizorev | G11B 5/02 |
| | | | 360/55 |

* cited by examiner

3DMR MEDIA WITH MULTIPLE WRITE FIELD LEVELS

SUMMARY

A three-dimensional magnetic recording (3DMR) media can, in accordance with some embodiments, consist of a single recording layer configured with three or more separate magnetization levels that can be written and read-back to store more information than in a conventional 2-level bit of data. A first magnetization level can be written to a selected region of said recording layer by applying a first write field to the grains of said region to form a "spin-up" magnetization in the grains of said region. A second magnetization level can be written by applying a second opposite write field to selected grains of said region to form a "spin-down" magnetization. At least a third intermediate magnetization level can be written by applying a weaker or alternating write field to grains of said region to form an intermediate magnetization comprising a mixture of spin-up and spin-down grains. By such method, said region may comprise a data bit capable of storing 3 or more units of information corresponding to the number of separate magnetization levels employed.

DETAILED DESCRIPTION

Figure 1:
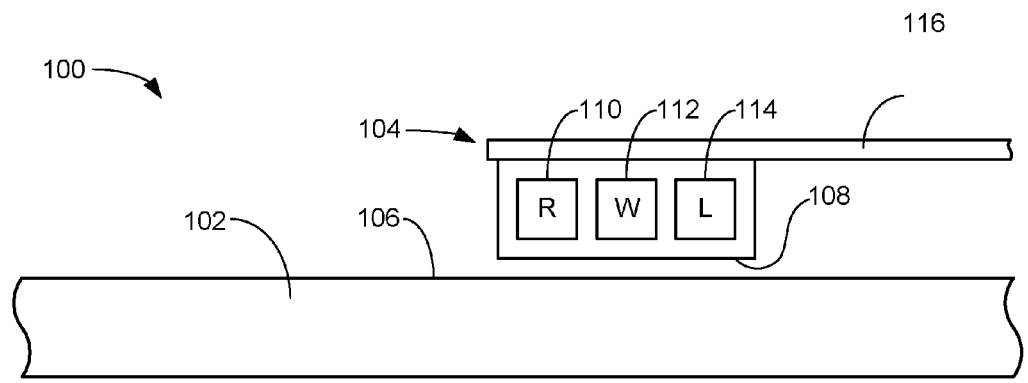
FIG. 1 depicts an example data recording system in accordance with some embodiments.

There is a continuously increasing demand for higher areal recording density as well as higher data rate in recording systems. This puts a particular premium on increasing especially the linear recording density of magnetic recording media. Already in conventional perpendicular recording technology, the bit length in some systems is approaching 10 nm, not much larger than the size of an individual magnetic grain or particle. This provides an extreme technical challenge, imposing increasingly greater demands on thin film magnetic recording media in terms of smaller thermally stable grains, coercivity (Hc); magnetic remanance (Mr); coercivity squareness (S*); medium noise, eg., signal-to-medium noise ratio (SMNR), etc.

The extremely small bit length further exacerbates the serious problem of spacing loss in the recording system as the head-disk spacing approaches the bit length. The well known spacing loss term increases exponentially, and at some point will become insurmountable. Thus, there is a need in the art to find a way to increase linear density and data rate in a magnetic recording system.

The authors recognize that the effective linear bit density and data rate of accessing stored information can be significantly increased without increasing linear density of the physical structures in the recording media if more than one bit of information can be stored at each laterally positioned information storage unit. Such information density can be increased in magnetic recording media if more than two independent magnetization states can be written into one conventional lateral region of the media conventionally defined as a written bit. In the conventional case, the bit region is either magnetized "up" or "down", providing two states (1 or 0) comprising a bit. If the same area can be written and read with multiple levels of magnetization, more information can be stored, eg., (+1, 0, −1) or (+1, +⅓, −⅓, −1); the data rate and linear information density are increased by 50% or 100% in the examples.

One approach to increasing the number of magnetization levels in a lateral unit of the recording system is to provide at least two vertically stacked and independently switchable recording layers. Such a media has been designated as three dimensional magnetic recording (3DMR) media. The opportunity for increased effective linear density and data rate of such media is clear. However, there are many manufacturing and technical challenges to achieve recording media with the required magnetic properties to obtain good recording performance in both very thin layers that avoid excessive spacing losses particularly in the buried or bottom layer. Hence, various embodiments of the present application provide an alternative method and apparatus to achieve multilevel recording in a single layer magnetic recording structure.

Assorted structures and methods are directed to a three dimensional magnetic recording (3DMR) medium that utilizes multiple write field levels to partially write a recording layer to define multiple different magnetization states. A 3DMR system can utilize a single layer to produce no extra spacing loss of a bottom layer and simplicity of manufacturing with a variety of fabrication procedures. To employ such a structure, write fields are employed to produce intermediate magnetization levels. The number of levels is not restricted by the moment of the sublayers as in multiple layer media. One can define 3 or more layers as desired, limited only by the signal-to-noise ratio (SNR) resulting from the separation of magnetization levels and error in producing desired magnetization states.

Various embodiments of partial writing of media entail that the writing of each magnetization level be separated by a large write field difference. Media should thus have a relatively large switching field distribution (SFD).

In some embodiments, SFD may be increased by reducing lateral exchange coupling (Hex) as can be observed by the increased "shearing" of a hysteresis loop measured from such media. SFD also results from grain-to-grain differences in the anisotropy (Hk) and grain stability (KuV) that depend upon structural properties such as grain size; as long as the grains are decoupled sufficiently to switch separately.

In some embodiments, SFD can be increased by raising the maximum switching field to a level higher than that which a conventional head is capable of switching. The saturated magnetization state can then be achieved by employing a write assist technology such as heat assisted magnetic recording (HAMR) or microwave assisted magnetic recording (MAMR). The intermediate 'partially written" magnetization levels may be achieved by reducing field strength, reducing or turning off the write assist mechanism, or employing a zero or reversed head field for a portion of time the head is accessing a specified bit to be partially written.

Various embodiments of partial writing of media arrange that readback of each magnetization level be separated by a large magnetic moment difference. Reduced moment difference between levels corresponds to increased electronic noise in the system. Media should thus have a large moment (Mst) to increase separation of signal levels.

In various embodiments, a 3 level setup can have target magnetization levels of +Ms, 0, −Ms. and a 4 level setup can target +Ms, +0.33, −0.33, −Ms. However, in some embodiments the intermediate level magnetization target might be slightly higher or lower than 0.33 to achieve maximum level separation because the saturated magnetization level error can be different than the error in intermediate magnetization levels. Thus, for embodiments where the saturation magnetization level is more stable than the intermediate levels, a 4 level setup can target +Ms, +0.33−+0.5, −0.33−−0.5, −Ms. For embodiments where the saturation magnetization level is less stable than the intermediate levels, a 4 level setup can target +Ms, +0.20−+0.33, −0.20−−0.33, −Ms. As the intermediate write power targeting is improved, the level separation between the intermediate levels can be reduced.

These and other features of various embodiments can be understood beginning with a review of FIG. 1, which represents aspects of a data storage system 100. The system 100 has a rotatable data recording medium 102 and an adjacent data transducer 104. The data transducer 104 is characterized as employing heat assisted magnetic recording (HAMR), although such is merely by way of illustration and not limiting. Generally, the medium 102 and the transducer 104 may be incorporated into a hard disc drive (HDD) or other data storage device in which multiple axially arranged recording media (discs) and HAMR data transducers are used to read and write user data from a host device.

In some embodiments, the data are stored on the medium 102 along a number of concentric tracks (not shown) defined along a surface 106 of the medium. The data may be stored in the form of addressable user data sectors of fixed size along the tracks. Hydrodynamic features (such as an air bearing surface 108) may be provisioned on a facing surface of the transducer 104 to enable the transducer to be fluidically supported in close proximity to the medium surface 106 by atmospheric currents established during rotation of the medium 102.

The data transducer 104 is shown to include respective read (R), write (W) and light source (L) elements 110, 112 and 114. The read element 110 may take the form of a magneto-resistive (MR) sensor. The write element 112 may include a write coil and one or more magnetically permeable cores. The light source 114 may take the form of a laser diode, a near field transducer (NFT), or other radiation beam and/or thermal energy source.

During a read operation, the read element 110 operates to sense a magnetization sequence written to the medium 102 along a portion of a selected track. During a write operation, the light source element 114 projects a high powered irradiation "dot" on the rotating medium 102 to locally increase the temperature of the medium, and the write element 112 directs magnetic flux into the heated portions of the medium to write a desired magnetization sequence. The transducer 104 is supported by an actuator arm 116, which, responsive to a servo control system (not shown), radially positions the respective elements 110, 112 and 114 adjacent the disc surface 106 as required.

Figure 2:
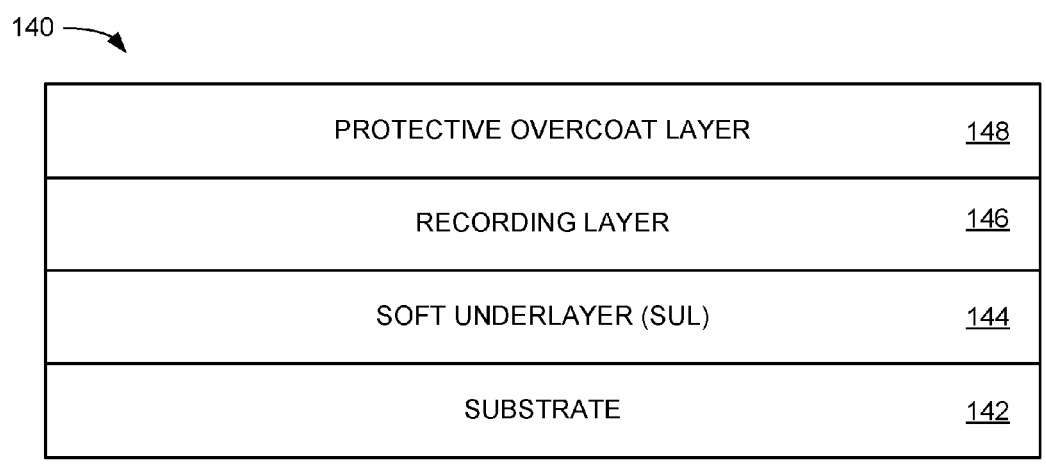
FIG. 2 displays a block representation of a portion of an example data storage medium constructed and operated in accordance with some embodiments.

FIG. 2 is a schematic depiction of various layers of an example recording medium 140 useful in a data storage system such as described above in FIG. 1. Other media configurations can readily be used, including configurations with different numbers and/or orderings of layers. It will be appreciated that FIG. 2 is functional in nature and is not drawn to scale so that each of the respective layers shown in FIG. 2 will have its own respective thickness. Each layer may be formed from a plurality of layers of like or different construction. Seed layers, intermediate layers, coupling layers, etc. may also be used as desired.

A base substrate 142 provides mechanical support for the medium 140. A recording structure is formed on the base substrate 142 made up of a number of layers. A soft magnetic underlayer (SUL) 144 is formed on the substrate, such as via sputtering. The SUL 144 provides a return path for magnetic flux during a data recording operation. One or more intermediate layers, also referred to as interlayers (IL), can be formed on the SUL to establish a magnetic easy axis in the perpendicular direction, and may have high surface roughness to induce grain separation in the subsequently deposited recording layers. In some embodiments, a single recording layer 146 is positioned atop the SUL and consists of a first type of data recording, such as perpendicular recording, MAMR, HAMR, and BPM.

A protective overcoat layer 148 is formed on the single recording layer 146. Various configurations of the protective overcoat layer 148 protect the medium 140 against environmental effects, such as inadvertent contact between the medium 140 and the transducer (e.g., 104 in FIG. 1). The overcoat layer 148 can further provide increased energy coupling between the medium 140 and a HAMR recording system such as discussed in FIG. 2.

Magnetization and signal levels are very sensitive to the surrounding bit pattern, even for two-level saturated +Ms and −Ms recording. The magnetic field required to saturate magnetization or write a partially magnetized data bit level is also dependent upon the prior recorded pattern. Thus, in some embodiments the selected write field to write each magnetization level is adjusted for each specified bit to be written, based upon the magnetization pattern that will be written before and after the specified bit. In this manner, the target magnetization levels may be adjusted to maximize the separation between the resulting readback signal levels.

Some preamps can account for the prior recorded pattern and compensate the writing field so as to form more consistent intermediate levels. In some embodiments, the magnetization level of a bit can be raised or lowered by adjusting the timing of the applied field switch earlier or later respectively. In other embodiments, the "write triplet" (current, overshoot, and overshoot duration) may be adjusted depending on the written pattern. In yet other embodiments, the head field may be switched with a clock speed much higher than the corresponding bit spacing. In such manner, the head field could be switched during writing of a single bit so as to apply up field only during a percentage of the bit write time.

Figure 3:
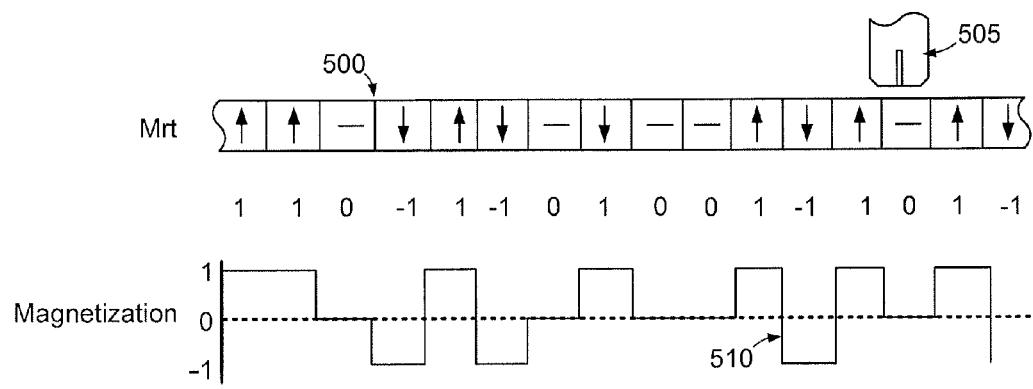
FIG. 3 represents various portions of an example data storage system constructed and operated in accordance with some embodiments.
Figure 4:
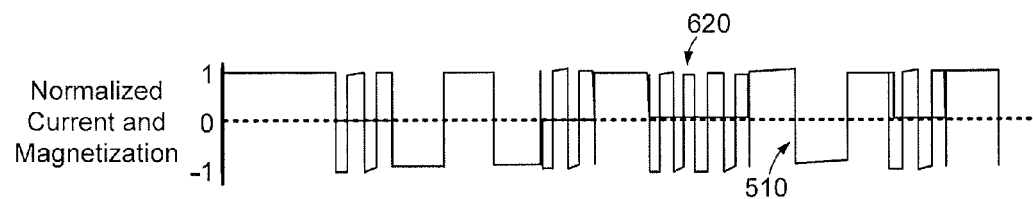
FIG. 4 plots operational data from an example data storage system configured in accordance with some embodiments.
Figure 5:
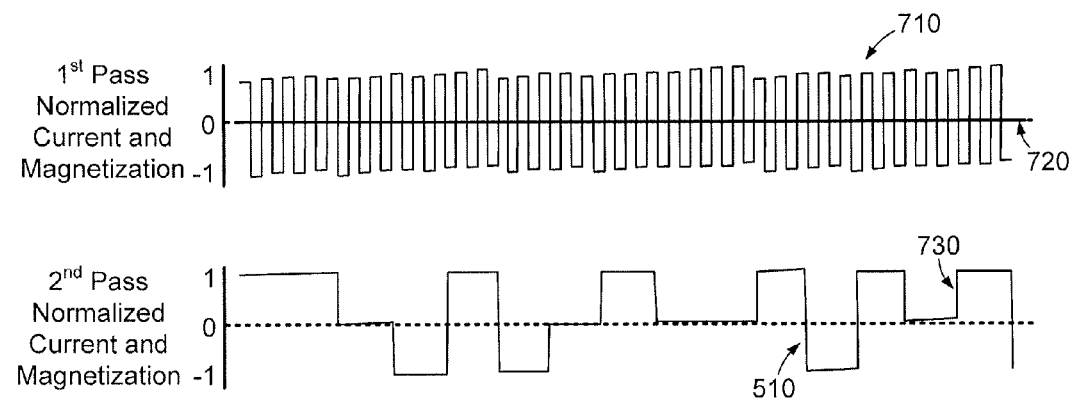
FIG. 5 graphs operational data from an example data storage system operated in accordance with some embodiments.

Two example embodiments of this approach as applied to form a "zero level" in the 3 level system are shown in FIGS. 3-5. FIG. 3 shows a desired 3-level information pattern 500 to be written by a head 505, and a 3-level magnetization pattern 510 representing that information stored in a medium.

FIG. 4 depicts the normalized write currents, fields, and media magnetization profiles of a one-pass method to write the desired pattern onto the medium using a preamp capable of switching the head field at a clock rate higher than the recording data-rate. The magnetization pattern 510 is written by applying a current profile 620 to the head. The regions with high frequency alternating current applied to the head produce field but equally in the up and down directions, and effectively erase the media to form the 0 magnetization levels. The regions with constant current applied for multiple clock cycles produce a strong field in the specified direction that write the +Ms and −Ms magnetization levels.

FIG. 5 depicts the normalized write currents, fields, and media magnetization profiles of a two-pass method to write the desired pattern onto the medium using a preamp capable of switching the head field at a clock rate higher than the recording data-rate. The magnetization pattern 510 is written by first applying a high frequency current profile 710 to the head. This produces a head field equally in the up and down directions, and effectively erases the media to form an all 0 magnetization levels pattern 720. The final magnetization pattern 510 is then achieved by applying a corresponding head current pattern 730 at the lower data-rate frequency, where +Ms and −Ms states are formed by applying appropriate currents to produce head fields in the desired directions, and the 0 state is achieved by applying no current or head field as the head passes over the medium.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a three dimensional magnetic recording medium comprising a soft magnetic underlayer contacting a single recording layer configured with three or more separate magnetization levels, the soft magnetic underlayer comprising a plurality of interlayers.

2. The apparatus of claim 1, wherein the single recording layer is disposed between a protective overcoat and a soft magnetic underlayer.

3. The apparatus of claim 1, wherein the single recording layer has a magnetic easy axis in a direction perpendicular to an air bearing surface.

4. The apparatus of claim 1, wherein the single recording layer is continuously magnetic.

5. The apparatus of claim 1, wherein the single recording layer comprises a plurality of magnetic grains.

6. The apparatus of claim 1, wherein the single recording layer is deposited on and separated from a substrate.

7. The apparatus of claim 1, wherein the single recording layer consists of a heat assisted magnetic recording data bit.

8. The apparatus of claim 1, wherein the single recording layer consists of a microwave assisted magnetic recording data bit.

9. The apparatus of claim 1, wherein the single recording layer consists of a bit patterned data bit.

10. A method comprising:
providing a three dimensional magnetic recording medium comprising a single recording layer configured with three or more separate magnetization levels; and
writing a first magnetization level by successively applying a partial write field to the single recording layer.

11. The method of claim 10, wherein the first magnetization level is written with multiple concurrent clock cycles applying a constant current to the three dimensional magnetic recording medium.

12. The method of claim 10, wherein the first magnetization level is written with an alternating current.

13. The method of claim 10, wherein a preamp executes the writing of the first magnetization level, the preamp switching a head field at a clock rate higher than the recording data-rate.

14. A method comprising:
providing a three dimensional magnetic recording medium comprising a single recording layer configured with three or more separate magnetization levels;
writing a first magnetization level by applying a first write current to the single recording layer; and
writing a second magnetization level by applying a second write current to the single recording layer.

15. The method of claim 14, wherein the first write current produces a magnetization pattern in the single recording layer with each data bit having a 0 magnetization level.

16. The method of claim 14, wherein the second write current differs from the first write current.

17. The method of claim 14, wherein the second write current produces first, second, and third magnetization levels in various data bits of the single recording layer.

18. The method of claim 14, wherein the second write current is zero to produce a zero magnetization level in the single recording layer.

19. The method of claim 14, wherein the first write current is executed at a higher data-rate frequency than the second write current.

* * * * *